United States Patent
Qian

(10) Patent No.: US 12,475,186 B2
(45) Date of Patent: Nov. 18, 2025

(54) METHOD, SYSTEM, AND COMPUTER DEVICE FOR REWRITING BROWSER SIDE VIRTUAL PATH

(71) Applicant: Yegan Qian, Hefei (CN)

(72) Inventor: Yegan Qian, Hefei (CN)

(73) Assignee: Hefei Hantai Network Science Technology Co., Ltd, Hefei (CN)

( * ) Notice: Subject to any disclaimer, the term of this patent is extended or adjusted under 35 U.S.C. 154(b) by 259 days.

(21) Appl. No.: 18/309,812

(22) Filed: Apr. 30, 2023

(65) Prior Publication Data

US 2024/0362294 A1 Oct. 31, 2024

(51) Int. Cl.
*G06F 16/957* (2019.01)
*G06F 16/958* (2019.01)
*H04L 9/40* (2022.01)
*H04L 67/02* (2022.01)

(52) U.S. Cl.
CPC ........ *G06F 16/9574* (2019.01); *G06F 16/986* (2019.01); *H04L 63/105* (2013.01); *H04L 67/02* (2013.01)

(58) Field of Classification Search
CPC . G06F 16/9574; G06F 16/986; H04L 63/105; H04L 67/02
See application file for complete search history.

(56) References Cited

U.S. PATENT DOCUMENTS

| | | | |
|---|---|---|---|
| 2004/0139204 A1* | 7/2004 | Ergezinger | H04L 67/14 705/26.1 |
| 2006/0080292 A1* | 4/2006 | Alanzi | G06F 16/951 |
| 2015/0046848 A1* | 2/2015 | Vohra | H04M 1/72436 715/760 |

FOREIGN PATENT DOCUMENTS

| | | | |
|---|---|---|---|
| CN | 104317570 A1 | | 1/2015 |
| CN | 110569463 A1 | | 12/2019 |
| CN | 113472752 A | * | 6/2021 |
| CN | 115563428 A1 | | 1/2023 |

* cited by examiner

*Primary Examiner* — Joe Chacko

(57) ABSTRACT

The invention provides a browser side virtual path rewriting method, system and computer device, including: the system generates first level sites of a portal based on user role permissions, and loads all site pages and sub sites within the permissions according to the first site ID of the first level sites; when the browser renders the generated page, run the script file instructions to replace the original access address of the browser with the main path to be rewritten. After the user clicks a site, the script instruction calculates the path from the site to the first level site, and forms a sub site path by all site names and the separators between sites on the path; Call the history object, run the script command, and replace the original access address of the browser with the main path/site path to be rewritten. The invention solves the problem that traditional URL rewriting consumes more server-side resources and broadband resources, which makes it difficult for users to obtain a better experience, and also solves the problem that virtual path rewriting of HTML5 history objects cannot be refreshed.

5 Claims, 2 Drawing Sheets

| General Office | Personnel Department | R&D Department | Marketing Department | Personal Site | ...... |
FIG. 3
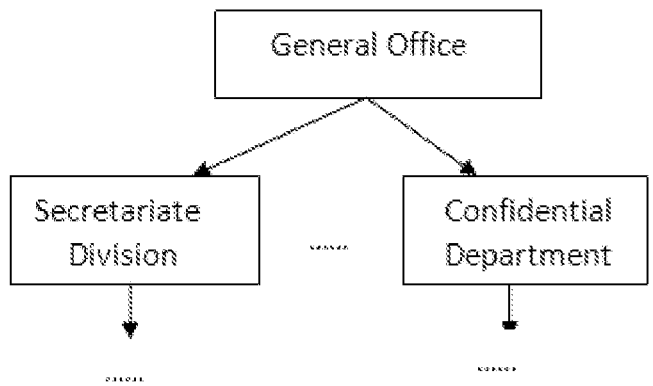
FIG. 4
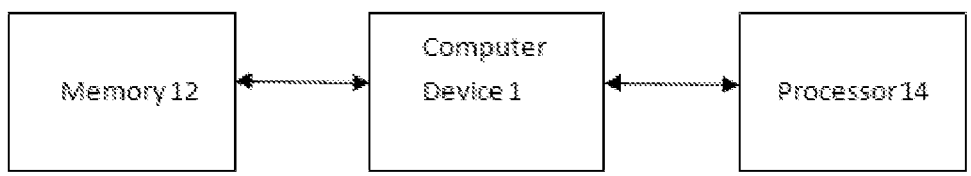
FIG. 5

METHOD, SYSTEM, AND COMPUTER DEVICE FOR REWRITING BROWSER SIDE VIRTUAL PATH

CROSS-REFERENCE TO RELATED APPLICATION

The present application claims priority to the Chinese patent application NO. CN202210855034.3 filed in the State Intellectual Property Office of the P.R.C. on Jul. 20, 2022, which is incorporated herein by reference in its entirety.

TECHNICAL FIELD

The present invention relates to portal technology, in particular, to a method, system, and computer device for rewriting virtual paths on the browser side of portal systems.

BACKGROUND OF THE INVENTION

In the process of building an enterprise information portal (EIP), in order to improve the security of the portal system and facilitate users to remember the site address, the Uniform Resource Locator (URL) is often rewritten. Traditional URL rewriting often requires page postback, which increases the computing power and throughput of the server, consumes more server-side resources and broadband resources, and may cause pages to flicker, making it difficult for users to get a better experience.

HTML5 has newly added the management of History object, but the history API is only used to update the browser side URL, and the browser will not send a request to the server. For example, after executing the history.pushState( ) method, the new state information will be added to the history state stack, only causing changes in the history object and a response in the address bar. However, changes in page content still need to be addressed separately by the R&D personnel, and additional JavaScript code needs to be written for implementation.

Moreover, when refreshing the page in practical applications, we usually use location.reload( ) or history.go (0) to do so. Because this approach is like clicking F5 on the client to refresh the page, when the page's method="post", a prompt of "webpage expiration" will appear. That's because of the security protection mechanism of the session. It can be imagined that when the location.reload( ) method is called, the web page already exists in the server's memory, so it must be IsPostback. If there is such an application: we need to reload the page, which means we expect the page to be recreated on the server. We expect it to be Not IsPostback. Although location.replace( ) can complete this task, in the portal system, the generated URL is often a virtual path and not an actual resource. The aforementioned solution can only obtain HTTP 404 error reports where the accessed resource does not exist.

SUMMARY OF THE INVENTION

In order to solve the above practical problems, the invention provides a virtual path rewriting method, system and computer device on the browser side of the portal system, which solves the problems that traditional URL rewriting consumes more server-side resources and broadband resources, as well as the difficulty for users with page flickering to obtain better experience. At the same time, it solves the problem that HTML5 history objects only update browser's URL, unable to partially refresh changes in the content of the page and site, and unable to solve the problem that the browser cannot be refreshed after rewriting to a virtual path.

In order to achieve the above purpose, the invention adopts the following technical scheme:

The present invention provides a virtual path rewriting method on the browser side of a portal system, comprising:

The user logs in to the portal system through the browser. The portal system generates first level portal sites on the main navigation bar of the SPA single page according to the user's role permissions, loads all site pages and sub sites within their permissions according to a first level site or default site ID, and displays the default portlets in the main display area of the single page to generate new single page content information;

The portal system server returns the generated page content information along with relevant CSS and JavaScript files to the client browser. When the browser renders the generated page, it calls the HTML 5 History object and runs the instructions history.pushState( ) or history.replaceState( ) in the JavaScript file to replace the browser's original access address with the main path of the path to be rewritten; after the user clicks any first level site of the portal system, the browser side sends an asynchronous request to the portal system server through the XMLHTTP protocol. The portal system server returns the data requested according to the information of the first level site clicked in the navigation bar. After the browser obtains the relevant data, it partially refreshes the single page, enters the first level site clicked, calls the history object, and runs the history.pushState( ) instruction in the file, replace the original access address of the browser with the main path/first level site name of the path to be rewritten.

The portal system includes first level sites, each first level site can contain multiple sub sites, and each sub site can also contain multiple sub sites, forming a recursive site tree. The first level, sub site, and any site in the recursive site tree of the portal system all contain at least one site page, and each site page can contain one or more portlets.

The first level site of the portal system, any site in the site tree, and site pages can be customized by users and generated dynamically and virtually by the portal system. There is no actual corresponding URL resources including the site, site pages and portlets on the server side of the portal system.

After the user clicks on a sub site of the portal system, the browser sends an asynchronous update request to the portal system server through the XML HTTP protocol. The portal system server returns the requested data based on the information of the sub site. After obtaining the relevant data, the browser partially refreshes the page sidebar and main display area information to enter the clicked sub site;

The front-end script, such as JavaScript, calculates the path from the sub site to the first level site, and forms the sub site path from all site names and inter site separators on the path; And call the History object, run the history.pushState( ) command in the file, and replace the browser's original access address with the main/sub site path to be rewritten.

After a user clicks on a portal system site page or portlet, the portal system server loads the requested data based on the site page or portlet information. The front-end script, such as JavaScript, adds the name information of the site page or portlet to the rewritten path in the browser address bar.

Running the history.pushState( ) instruction in JavaScript file to replace the browser's original access address with the path to be rewritten, meanwhile, a browser state object instance is generated, which includes information such as site, page, and site path.

In the JavaScript file, capture the event objects invoked by the browser's forward and backward buttons, call relevant JavaScript functions based on the information of the site, page, site path, etc. in the objects, and send asynchronous update requests to the portal system server through the XML HTTP protocol. The portal system server returns the requested data based on the site path information or page information, after obtaining relevant data, the browser partially refreshes the page sidebar and main display area information, notifying the browser to restore the previous and subsequent status information in the current page state.

In the global HTTP application processing file, for HTTP requests, check whether the URL of the request contains the main path and whether it contains the portal system single page file suffix name. If it does not, return to exit the global HTTP application request processing. Otherwise, read the URL rewriting regular rules, read the server-side content based on the request content, and regenerate the portal system page content.

According to another aspect of the invention, a system for virtual path rewriting on the browser side of a portal system is provided, including a user login module, a portal management module, a virtual path rewriting module on the browser side, and a global HTTP application processing request filtering module.

Among them, the portal management module includes generating first level portal sites based on user role permissions, and loading all site pages and sub sites within its permissions based on the first level site or default first site ID; The first level sites of the portal system, any site in the site tree, and site pages are customized by the user and generated dynamically and virtually by the portal system. There are no actual corresponding URLs, sites and site pages on file directories of server side of the portal system; after the user clicks on any sub site of the portal system, the browser sends an asynchronous update request to the portal system server through the XML HTTP protocol. The portal system server returns the requested data based on the information of the sub site. After obtaining the relevant data, the browser partially refreshes the page sidebar and main display area information to enter the clicked sub site;

The first level sites, sub sites, and any sites in the recursive site tree of the portal system all contain at least one site page, which can contain multiple portal portlets.

Among them, the browser side virtual path rewriting module also includes: when a user logs in to the system, running the history.pushState( ) instruction in the JavaScript file, calling the HTML 5 History object, and replacing the browser's original access address with the main path of the path to be rewritten while the browser renders the generated page;

After a user clicks on any first level site of the portal system, the browser side sends an asynchronous request to the server side of the portal system through the XMLHTTP protocol. The server side of the portal system returns the requested data for updating according to the information of the first level site clicked in the navigation bar. After the browser obtains the relevant data, it partially refreshes the information of the side bar and the main display area of the page, enters the first level site clicked, and calls the history object, run the history.pushState( ) instruction in the file to replace the browser's original access address with the main path/primary site name of the path to be rewritten; and after the user clicks on any sub site in the portal system, JavaScript calculates the path from that sub site to the first level site, and forms the sub site path based on all site names and inter site separators on that path; and call the History object, run the history.pushState( ) instruction in the file, and replace the browser's original access address with the main/sub site path to be rewritten; run the history.pushState( ) instruction in the JavaScript file to replace the browser's original access address with the path to be rewritten, and generate a browser state object instance that contains information such as site, page, and site path; and After the user clicks on the portal system site page or portlet, the portal system server loads the requested data based on the site page or portlet information. The front-end script, such as JavaScript, adds the name information of the site page or portlet to the rewritten path in the browser address bar.

In the JavaScript file, capture the event objects invoked by the browser's forward and backward buttons, call relevant JavaScript functions based on the information of the site, page, site path, etc. in the objects, and send asynchronous update requests to the portal system server through the XML HTTP protocol. The portal system server returns the requested data based on the sub site path information or page information, after obtaining relevant data, the browser partially refreshes the page sidebar and main display area information, notifying the browser to restore the previous and subsequent status information in the current page state.

Among them, the global HTTP application processing request filtering module further includes: in the global HTTP application processing file, for any HTTP request, checking whether the request URL contains the main path and whether it contains the portal system single page file suffix name. If it does not, returning to exit the global HTTP application request processing and filtering out any system resource requests unrelated to rewriting regular rules; For system resource requests that require rewriting by regular rules, read the regular rules for URL rewriting and rewrite the browser side URL according to the URL rewriting regular rules; read the server side content based on the request content, regenerate the portal system page content, and complete the browser side refresh.

In another aspect of the present invention, a computer device is proposed, which includes a memory, a processor, and a computer program stored in the memory and capable of running on the processor. The processor is used to execute the steps of any method according to the above technical solution.

Another aspect of the present invention is to propose a computer-readable storage medium on which a computer program is stored. When a computer program is executed by a processor, the steps of any method as described in the above technical solution are implemented.

The present invention has the following beneficial effects:

1. Using the portal site name as a virtual path instead of the actual URL of system resources hides the actual URL of system resources, improves the security of the portal system, and facilitates users to remember and classify the site address and system resources;
2. Solved the problems of traditional URL rewriting and postback that consume a lot of server-side resources and broadband resources, as well as page flickering that makes it difficult for users to obtain a better experience;
3. It solves the problem that the HTML5 history object can only update and manage browser address bar's URLs, and can not send requests to the server and partially refresh page site content;

4. In a portal system, the generated URL is often a virtual path, not an actual resource path. Refreshing the browser can cause an HTTP 404 error problem where the resource is not accessed. The present invention solves the problem that the browser cannot refresh the virtual URL path;

5. During the global HTTP application processing of requests, a large number of system resources unrelated to regular rules for URL rewriting are filtered out, reducing the unnecessary computation of rewriting regular rules and URL rewriting on the server side, and saving the server side system resources.

BRIEF DESCRIPTION OF THE DRAWINGS

For better explanation of the technical solutions of the embodiments of the invention, the following is a brief description of the drawings needed to describe the embodiments. It is obvious that the drawings described below are only embodiments of the invention, and for those skilled in the art, other drawings can be obtained from these drawings without creative work. The invention can also be implemented in other ways different from those described herein. Therefore, the scope of protection of the invention is not limited by the specific embodiments disclosed below.

FIG. 3 is a schematic diagram of the first level sites navigation provided by the embodiment of the present invention;

FIG. 4 is a schematic diagram of the specific first site with sub sites structure provided by the embodiment of the present invention;

FIG. 5 is a schematic diagram of the computer device provided in the embodiment of the present invention.

DETAILED DESCRIPTION OF EMBODIMENTS

Figure 1:
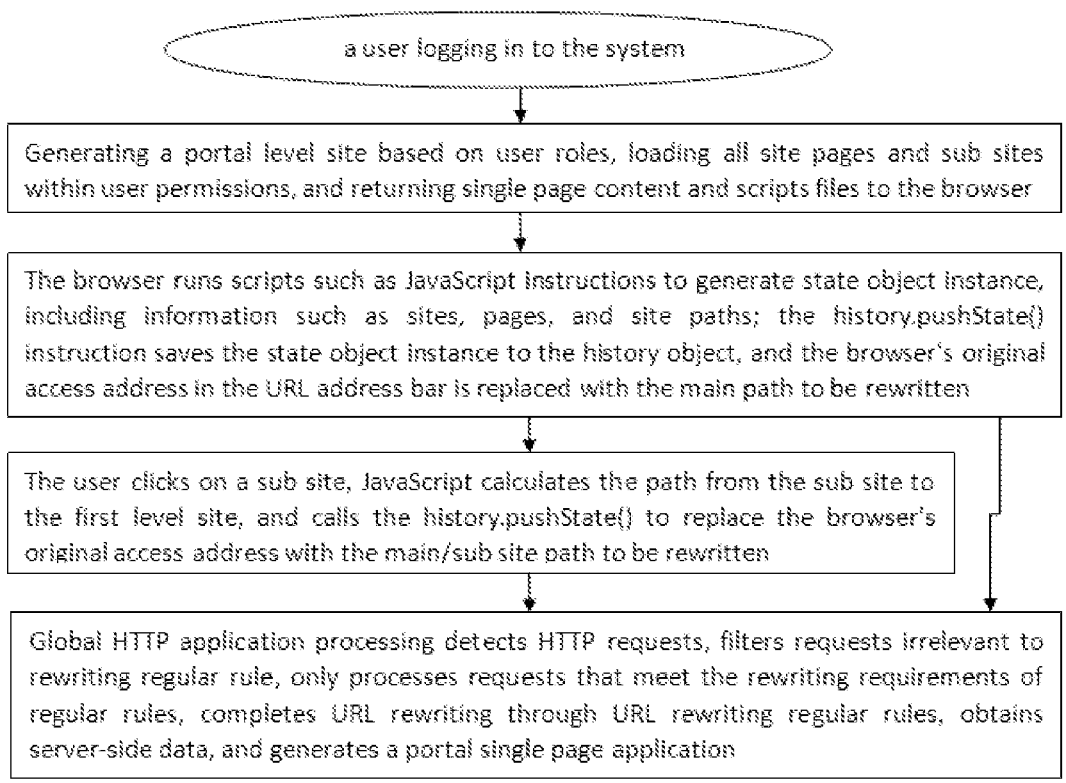
FIG. 1 is a flowchart of a method for virtual path rewriting on the browser side of a portal system provided by an embodiment of the present invention.
Figure 2:
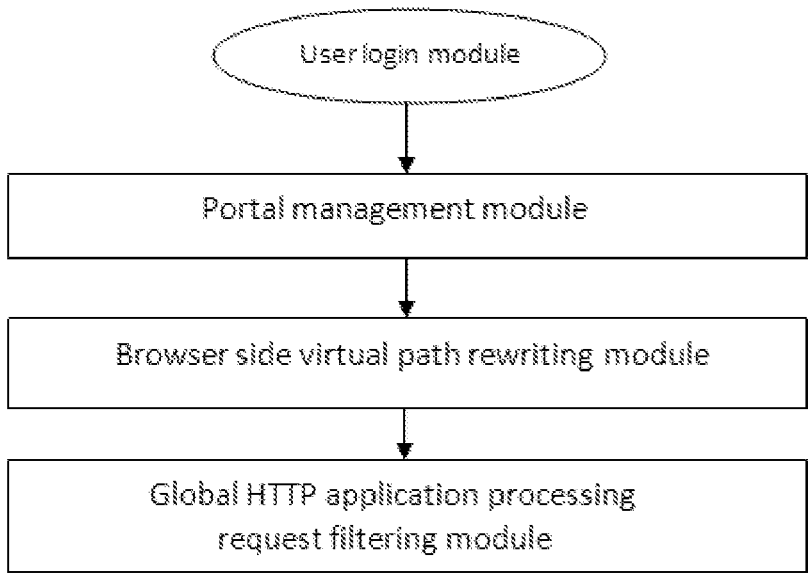
FIG. 2 is a schematic diagram of system modules for browser side virtual path rewriting provided by the embodiment of the present invention.

The embodiments of the invention are described in detail below in combination with the attached drawings. FIG. 1 and FIG. 2 respectively show the flow diagram of the browser side virtual path rewriting method of the portal system and the browser side virtual path rewriting module diagram of the portal system of the preferred embodiment of the invention.

Referring now to FIG. 1, it shows a flowchart of the virtual path rewriting method on the browser side of the portal system in the preferred embodiment of the present invention.

The user logs into the portal system through the browser. The portal system generates the first level portal sites as shown in FIG. 3 in the main navigation bar of the single page according to the user role permissions, loads all site pages and sub sites within their permissions according to the first level site or the default site ID, and displays the default page with portlets in the main display area of the single page, generates new single page content information; As shown in FIG. 4, each first level site of the portal system can contain multiple sub sites, and each sub site can also contain multiple sub sites, forming a recursive site tree. The first level site, sub site, and any site in the recursive site tree of the portal system all contain at least one site pages, and each site page contains at least one portlets.

The portal system server returns the generated page content information along with relevant CSS and JavaScript files to the browser. While rendering the generated page, it calls HTML 5 History object history.pushState( ) instruction to replace the browser's original access address with the main path to be rewritten; The main path to be rewritten here refers to the virtual path name rewritten to the browser address bar. Users can set personalized virtual path names according to their own conditions without any restrictions, such as setting the name as "smart platform" or "digital interconnection platform"; For example, the user uses the URL address on the browser side http://localhost:13029 Or http://localhost:13029/default.aspx After accessing the system, the address bar is rewritten as http://localhost:13029/Smart platform/or http://localhost:13029/Digital interconnection platform/.

After the user clicks on the portal system site, the browser sends an asynchronous update request to the portal system server through the XML HTTP protocol. The server returns requested data based on the site information. The browser obtains the relevant data and refreshes it locally to enter the clicked site; and JavaScript calculates the path from the site to the first level site, and forms the site path from all site names and inter site separators on the path; and call the History object, run the history.pushState( ) command in the file, replace the browser's original access address with the main path/site path to be rewritten, and generate a browser state object instance. The object instance contains information such as sites, pages, and site paths, and is saved in the History object.

In the JavaScript file, set the window.onpopstate processing function to capture the event objects invoked by the browser's forward and backward buttons. Based on the information of the site, page, site path, etc. in the object, call the relevant JavaScript functions, and send asynchronous update request to the portal system server through the XML HTTP protocol. The portal system server uses the path information or page information of the sub site, returns the data requested for update. After obtaining the relevant data, the browser partially refreshes the page sidebar and main display area information, notifying the browser to restore the previous and subsequent status information in the current page state.

The first level sites of the portal system, any site in the site tree, and site pages are all customized by the user and generated dynamically and virtually by the portal system. There is no actual corresponding URL on the server side of the portal system, and when the browser refreshes the page, it will receive an HTTP 404 error report that the accessed resources do not exist. Therefore, in the global HTTP application processing process, for any HTTP request, check whether its Request.RawUrl contains the site path and whether it contains the portal system single page file suffix name. If it does not, exit the global HTTP application request processing, otherwise, read the URL rewriting regular rules, read the server-side content based on the request content, and regenerate the portal system page content.

As shown in FIG. 2, the schematic diagram of a system for virtual path rewriting on the browser side includes: user login module, portal management module, global HTTP application processing request filtering module, and browser side virtual path rewriting module.

After the user accesses the portal management module through the login module, the portal management module generates a first level portal site based on the user's role permissions, and loads all site pages and sub sites within their permissions based on the first level site or default first site ID. The portal system first level site, sub site, and any site in the recursive site tree all contain at least one site pages, and each site page contains at least one portlets; and call the HTML 5 History object history.pushState( ) method to replace the browser's original access address with the main path to be rewritten while the browser renders the generated page.

After a user clicks on any site, page, or portlet in the portal system, they will send an XML HTTP request to the server. The global HTTP application processing request filtering module detects all HTTP requests. If Request.RawUrl contains a site path or a single page file suffix in the portal system, it will further call regular rules for URL matching and mapping and rewrite the browser URL according to the regular rules; If it does not contain a site path or a single page file suffix in the portal system, then return to exit the global HTTP application request processing and filter out any system resource requests unrelated to rewriting regular rules; for system resource requests that require rewriting regular rules, read the URL rewriting regular rules and rewrite the browser side URL according to the requirements of the regular rules. Based on the request content, read the server side content, regenerate the portal system page content, and complete the browser side refresh.

The browser side virtual path rewriting module is responsible for URL rewriting after users enter the portal management module:

After the user clicks on any site in the portal system, JavaScript calculates the path from that site to the first level site, and forms the site path based on all site names and inter site separators on that path; and call the History object, run the history.pushState( ) command in the file, and replace the browser's original access address with the main path/site path to be rewritten;

After the user clicks on the portal system site page or site page portlet, the portal system server loads the requested data based on the site page or site page portlet information. The front-end script, such as JavaScript, adds the name information of the site page or the portlet of the site page after the rewritten path in the browser address bar; at the same time, a browser status object instance is generated; the object instance contains information about the site, page, site path, etc. and is saved in the history object.

In order to capture the event object caused by the browser's forward button and back button, set the window.onpopstate processing function in the JavaScript file, call relevant JavaScript functions according to the site, page, site path and other information in the event object, and send an asynchronous update request to the portal system server through the XMLHTTP protocol, and the portal system server returns the requested data, after the browser obtains the relevant data, it partially refreshes the information in the side bar and the main display area of the page, notifies the browser to restore the previous URL address and subsequent URL address in the current status address bar, and completes the virtual path rewriting on the browser side.

As shown in FIG. 5, a computer device schematic diagram of a browser side virtual path rewriting method provided by the embodiment of the present invention. The computer device 1 includes a memory 12, a processor 14, and a computer program stored on the memory 12 that can run on the processor 14. The processor 14 is used to execute the steps of any method as described in the above embodiment.

According to the computer device 1 of the present invention, the processor 14 included therein is used to perform the steps of the browser side virtual path rewriting method in the above embodiment. Therefore, the computer device 1 can achieve all the beneficial effects of the browser side virtual path rewriting method.

The above is only a preferred embodiment of the present invention and is not intended to limit the scope of protection of the present invention.

What is claimed is:

1. A method for rewriting browser side virtual path, comprising:
    (1) a user logging into a portal system through a browser; the portal system generating first level portal sites according to the user's role permissions; and loading all authorized site pages and sub-sites based on a first site ID or default home site ID;
    (2) the portal system server transmitting generated page information with associated JavaScript files to the client browser, wherein the browser:
        (i) renders the page,
        (ii) invokes an HTML5 History object, and
        (iii) executes history.pushState ( ) instruction from the JavaScript files to replace the browser's original address with a target rewritten main path;
    (3) after the user clicking on a first level site of the portal system, the browser side sending an asynchronous request to the portal system server through XMLHTTP protocol; the portal system server returning requested data for updating according to the information of the first level site clicked on the navigation bar; after obtaining all relevant data, the browser partially refreshing the SPA single page, entering the first level portal site that is clicked, calling the history object to executes history.pushState( ) instruction to replace the browser's original access address with a rewritten main path/primary-level site name;
    (4) after clicking a subsite, the front-end script calculating a path from the sub-site to its associated first level site, wherein the sub-site path is formed by concatenating all site names along the path with separators; and invoking the history object to execute the history.pushState( ) instruction, thereby replacing the browser's original access address with rewritten main path/sub-site path;
    (5) generating a browser state object instance containing site information, page information, and site path information; and storing said state object instance in a history object via the history.pushState( ) instruction in the JavaScript file.

2. The method of claim 1, further comprising:
    upon a user clicking a portal page of the portal system, the portal system server loading requested data according to the information of the portal page; the front-end script, including JavaScript, adding the name information of the portal page to the rewritten path in the browser URL address bar; upon a user clicking a portal portlet of a site page, the portal system server loads requested data according to the information of the portal portlet of the site page; the front-end script, including JavaScript, adding the name information of the portal portlet of the site page to the rewritten path in the browser address bar.

3. The method of claim 1, further comprising:
    in said front-end script;
    capturing event objects invoked by the browser's forward button and back button, calling relevant JavaScript functions according to the object information including site, page, site path, sending an asynchronous request to the portal system server through the XMLHTTP protocol;

the portal system server returning the requested data according to the site information including page information or site path; after obtaining relevant data, the browser partially refreshing the single page information, notifying the browser to restore the previous and subsequent state information in the current page state.

4. The method of claim 1, further comprising:

in a global HTTP application processing module, for HTTP request, checking whether the URL of the request containing the main path and the portal system single page file suffix; exiting the global HTTP application request processing and returning if either element is absent; otherwise, reading the URL rewriting regex rules, reading the server side content according to the request content, and regenerating the portal system single page content.

5. A computer device comprising a memory, a processor, and a computer program stored on the memory and executable on the processor, wherein the processor is configured to execute the steps of the method according to any one of claims 1 to 4.

* * * * *